United States Patent

[11] 3,595,081

| [72] | Inventor | William A. Byars |
| | | London, England |
| [21] | Appl. No. | 762,232 |
| [22] | Filed | Sept. 16, 1968 |
| [45] | Patented | July 27, 1971 |
| [73] | Assignee | Elliott Brothers (London) Limited |
| | | London, England |
| [32] | Priority | Sept. 28, 1967 |
| [33] | | Great Britain |
| [31] | | 44,187/67 |

[54] FLOWMETERS
7 Claims, 10 Drawing Figs.

| [52] | U.S. Cl. | 73/231 R |
| [51] | Int. Cl. | G01f 1/06 |
| [50] | Field of Search | 73/229–231 |

[56] References Cited
UNITED STATES PATENTS

| 2,814,949 | 12/1957 | Bodge | 73/194 |
| 2,943,487 | 7/1960 | Potter | 73/231 |
| 3,049,917 | 8/1962 | Alspach et al. | 73/194 |
| 3,232,110 | 2/1966 | Li | 73/231 |
| 3,344,666 | 10/1967 | Rilett | 73/231 |

Primary Examiner—James J. Gill
Assistant Examiner—Herbert Goldstein
Attorney—Wenderoth, Lind and Ponack ABSTRACT: A fluid flowmeter which gives an output pulse for each unit of fuel passing through the meter and which also gives pulses at a characteristic "zero flow" rate when no fluid is flowing. Inhibitor means are provided to prevent zero flow rate pulses from affecting the indicator means and in order to check the accuracy of the flowmeter switch means are provided for overriding the inhibitor means at will so that zero flow rate pulses may be used to give a flow rate indication.

DATA PROCESSING CIRCUIT

WILLIAM ALEXANDER BYARS,
Inventor

BY. *Wendworth, Lind & Ponack.*
Attorneys

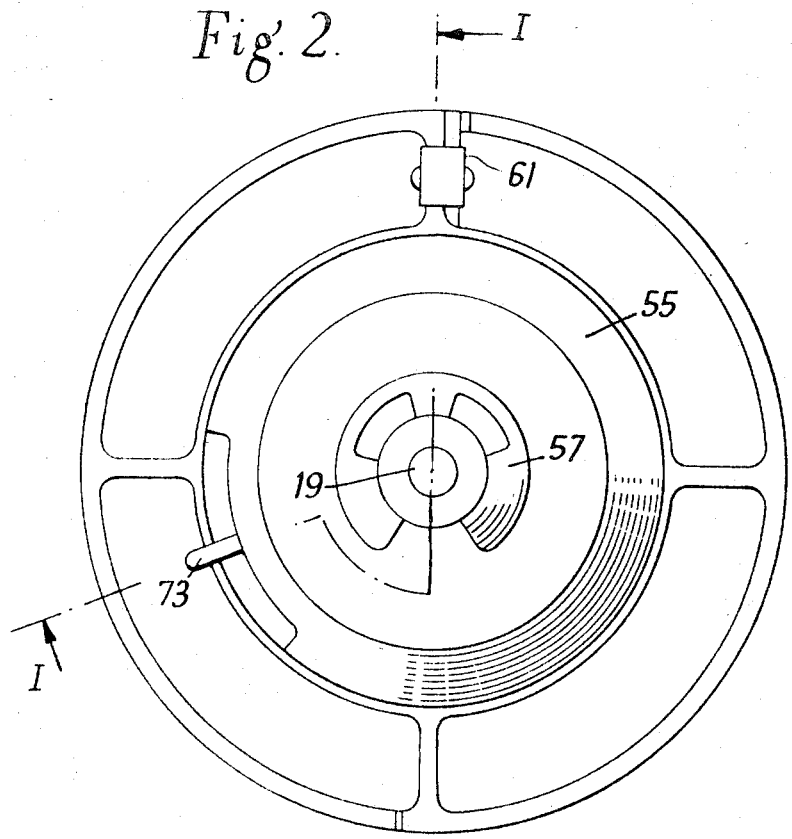
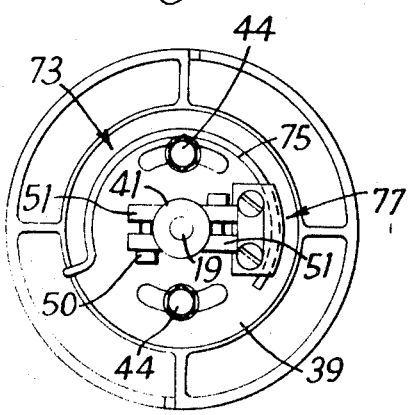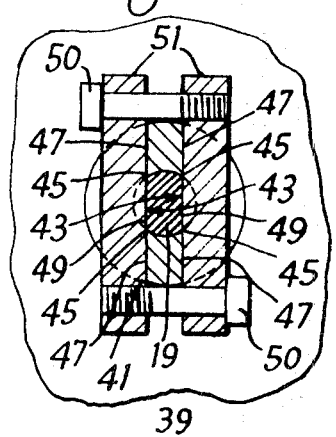
William Alexander Byars,
Inventor
BY Wentworth, Lind & Ponack,
Attorneys

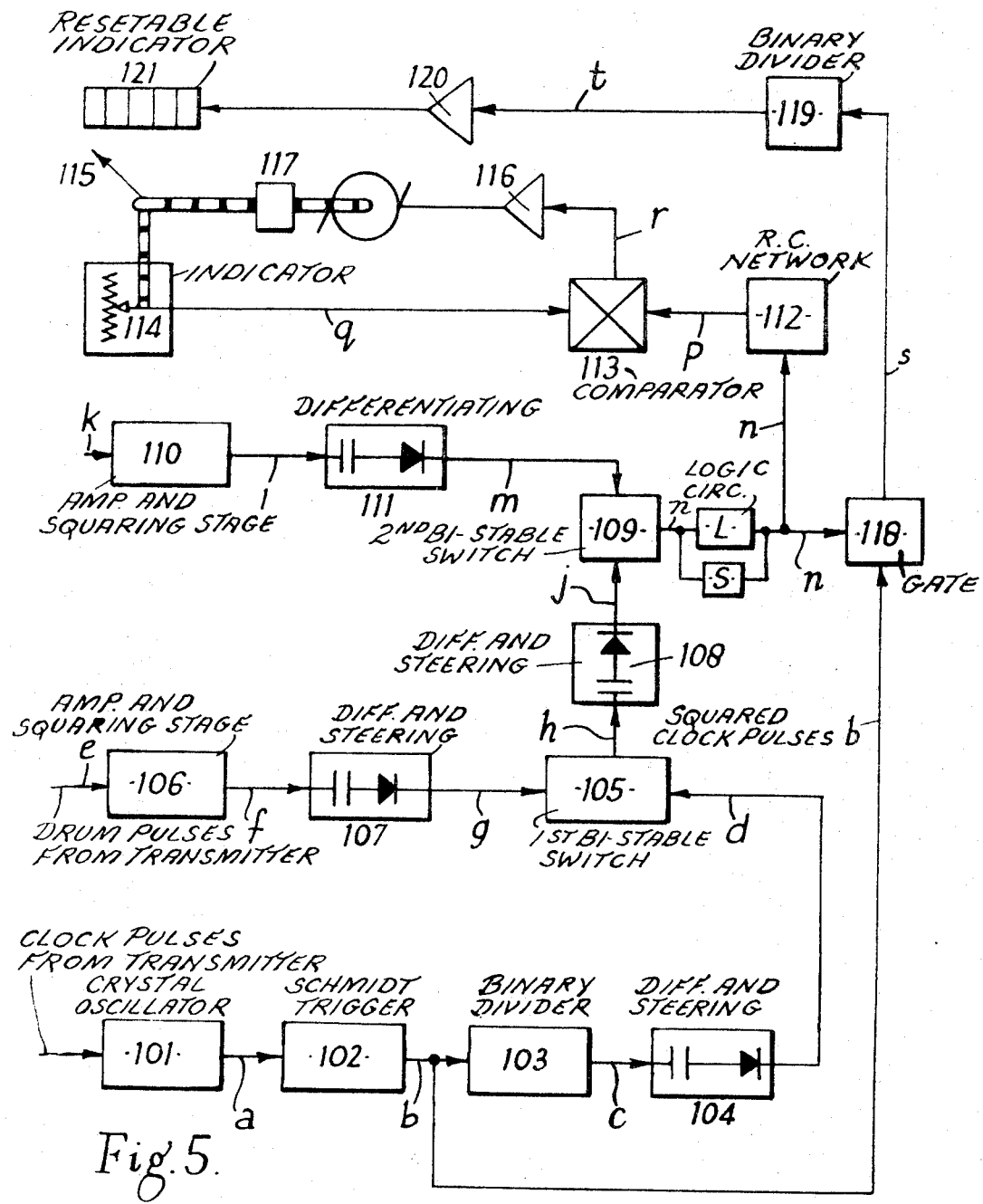

FLOWMETERS

This invention relates to fluid flowmeters and is particularly concerned with fluid flowmeters which incorporate means for checking flowmeter integrity.

According to the invention there is provided a fluid flowmeter comprising a transmitter operative to develop an output characteristic of the rate and duration of fluid flow therethrough, zero flow rate giving rise to a characteristic output of the same general nature as the outputs for nonzero flow rates; indicator means; data processing circuitry operative to supply to the indicator means signals dependent on the transmitter output for nonzero flow rates only; and control means operable at will to render the data processing circuitry operative to supply to the indicator means signals dependent on the transmitter output for zero flow rate.

Preferably the data processing circuitry comprises inhibiting means responsive to the transmitter output for zero flow rate to prevent such output affecting the indicator means; and override means for overriding the inhibitor means at will.

Preferably the inhibiting means comprises a logic circuit having an input to which is applied signals derived from the transmitter output and an output which supplies signals to said indicator means, the logic circuit being arranged to give output signals in response only to input signals characteristic of a nonzero flow rate; and the override means comprises switch means operable to provide a shunt path from input to output of the logic circuit.

The indicator means may comprise a fluid flow rate indicator.

The data processing circuitry may be operative in response to the output signal developed by the transmitter so as to develop or generate discrete signals each of which represents the passage through the transmitter of a certain quantity of fluid; and the indicator means then comprises a resettable indicator which is responsive to the discrete signals developed by the data processing circuitry so as to indicate the quantity of fluid which has passed through the transmitter.

The resettable indicator may represent the quantity of fluid as an accumulative total; or, alternatively, it may represent the quantity of fluid which has passed as the diminution of some quantity of fluid initially indicated by the indicator. Where the flowmeter is a fuel flowmeter fitted, for example, in an aircraft, the resettable indicator would be a fuel consumed or, in the alternative, a fuel remaining indicator.

The switch means may comprise a timing circuit, and a switch which shunts the logic circuit and which is adapted to be closed for a predetermined period when the timing circuit is rendered operative.

There may be reset means automatically operative following the predetermined period, during which the data processing circuitry is responsive to zero flow rate signals from the transmitter, to apply to the resettable indicator signals operative to reset the indicator to a datum, e.g. zero, value.

The reset means may comprise another timing circuit which is adapted to be rendered operative by the first mentioned timing circuit at the termination of the predetermined period; and an "AND" gate one input of which is connected to a signal source, another input of which is connected to the output of the said other timing circuit, and the output of which is connected to resettable indicator so that signals gated from the signal source, to the "AND" gate output, after the other timing circuit has been rendered operative, are supplied to the indicator so as to reset the indicator to the desired datum value.

The signals characteristic of fluid flow rate and the period during which the flow rate persists, may comprise groups of pulses; and the data processing circuitry is operative in response to pulse groups characteristic of a nonzero flow rate to develop pulses each of which represents the passage, through the transmitter, of a certain quantity of fluid.

At least one of the timing circuits may comprise a monostable circuit arrangement.

A true mass fuel flowmetering system for an aircraft embodying the invention is hereinafter described with reference to the accompanying drawings, in which:

FIG. 2 shows an end elevation of the transmitter of FIG. 1;

FIG. 3 shows a detail of the transmitter of FIG. 1;

FIG. 4 shows another detail of the transmitter of FIG. 1;

FIG. 5 is a block schematic diagram showing the data processing circuitry of the system;

Figure 1:
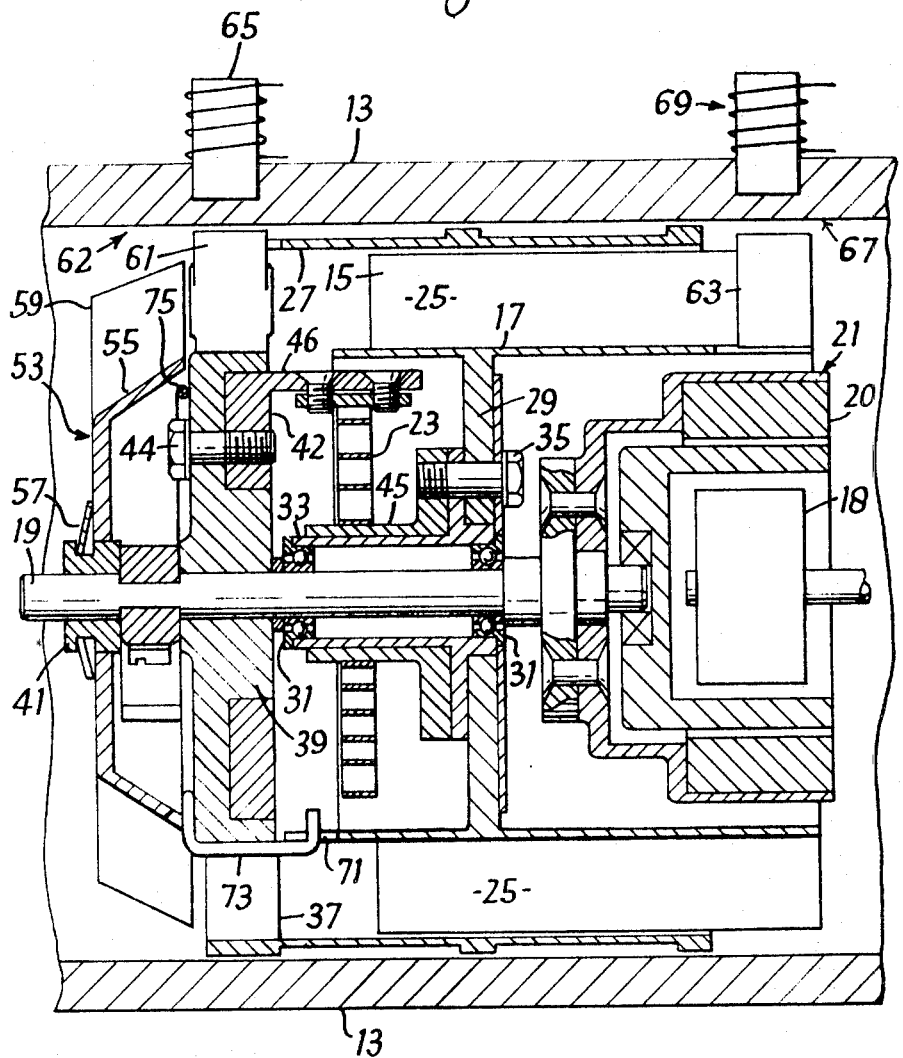
FIG. 1 shows a section of part of the transmitter of the system, the section being taken on I-I of FIG. 2.

Referring to FIGS. 1 to 4 the transmitter essentially comprises a nonmagnetic conduit 13, of an aluminum alloy, for example, adapted to be connected in the fuel supply line (not shown) to an aircraft engine; and, housed within the conduit, an impeller 15 and an electric drive motor 18 which is contained within a sealed housing 21 and coupled to the impeller 15 by a rotary magnetic coupling 20, a shaft 19 and a flat spiral spring 23 having a substantially linear force/deflection characteristic.

The impeller 15 comprises a generally cylindrical part 17 and a plurality of vanes 25 which project radially from and extend in the direction of length of the cylindrical part 17. The impeller 15 is encompassed by a drum member 27 the inner surface of which is closely adjacent the tips of the radially projecting vanes 25.

The impeller 15 has an inwardly projecting flange 29 and is supported coaxially of the shaft 19 by a support arrangement which comprises bearings 31 and a bearing housing 33. The inner races of the bearings 31 are fixed to the shaft 19; the outer races are fixed to the housing 33 and the housing 33 is secured by bolts, as 35, to the flange 29.

The drum 27 is connected by radial members 37 to a hub 39 by which the drum is supported on the shaft 19 coaxial with the impeller 15. Hub 39 has an axially extending cylindrical portion 41 (FIGS. 1, 3 and 4) which, over a portion of its length, is milled through so as to provide diametrically opposed window portions 43 each bounded at two opposite edges 45 by flat surfaces 47.

The shaft 19 has flat surfaces 49 and the windows 43 of the cylindrical portion 41 register with the flats 49 so that the flats 47 and 49 lie in a plane. A pair of clamp bars 51 contact the flats 47 and 49 and are secured together by screws 50. As a result, the hub 39 of the drum 27 is fixed to the shaft 19.

The cylindrical portion 41 supports a turbine 53 the hub 55 of which is pressed into frictional engagement with the hub 39 of the drum 27 by a spring circlip 57. The blades 59 of the turbine 53 are inclined to the axial direction of the transmitter and are in the path of fuel flow through the annular space between the drum 27 and the impeller 15.

An annular member 42 which is secured by bolts, as 44, to the hub 39 has an axially extending portion 46 to which one end of the spring 23 is secured. The other end of the spring 23 is secured to a flanged sleeve 45 which surrounds the bearing housing 33 and which is secured to the impeller 15 by the bolt 35, securing the bearing housing 33 to the impeller.

Supported on the hub 39 there is a permanent magnet 61; supported on the impeller 15 there is a permanent magnet 63. The permanent magnet 61 constitutes the movable part of a first pulse pickoff device 62, the fixed part of which is constituted by a first ferromagnetic core and solenoid arrangement 65 fixed to the transmitter conduit 13; the permanent magnet 63 constitutes the movable part of a second pulse pickoff arrangement 67, the fixed part of which is constituted by a second ferromagnetic core and solenoid arrangement 69, also fixed to the transmitter conduit 13.

In the path of fuel flow, upstream of the impeller 15, the transmitter is fitted with flow control means (not shown) which ensures that any overall swirl component present in fuel reaching the impeller acts to partially compensate for nonlinearities due to manufacturing tolerances in the transmitter, particularly in the spring 23 coupling the drum 27 and impeller 15.

A description of the flow control means is not strictly necessary for an understanding of the present invention. In practice the flow control means may comprise a set of flow straightening vanes and an adjustable swirl rudder or vane immediately adjacent the trailing end of one of the flow straightening vanes. For a more detailed description of such flow control means reference should be made to the complete specification of British Pat. Ser. No. 1,069,466.

There is a stop arrangement which limits relative rotation, in one sense, between the drum 27 and the impeller 15. The stop arrangement comprises an axially projecting tongue portion 71 on the impeller 15 and a buffer spring 73, in the form of a length of wire, fixed with respect to the drum 27. The buffer spring 73 has a generally C-shaped portion 75 which is adjustably fixed to the hub 39 by a screw clamp device 77 (FIG. 3). The spring 73 is bent so as to extend around the periphery of the hub 39 and project into the path of movement of the tongue 71. The adjustment of the spring 73 is such that when the tongue 71 and the spring 73 are in contact there is a predetermined small angular displacement between the permanent magnets 61 and 63 carried by the drum and impeller 15, respectively.

In operation, with the motor 18 driving the impeller 15 by way of the spring 23, fuel flowing substantially axially of the transmitter is angularly accelerated by the impeller 15. The angular acceleration given to the fuel is dependent on the flow rate of the fuel and results in a winding up of the spring 23 coupling the drum 27 and the impeller 15. The amount by which the spring 23 is wound up is reflected in the angular displacement between the permanent magnets 61 and 63 carried by the drum 27 and impeller 15, respectively.

The angular displacement between the drum and impeller magnets 61 and 63 is a function of motor speed and fuel flow rate. However, the time interval between the passage of the magnets 61 and 63 past their respective ferromagnetic core and winding arrangements 65 and 69 would, but for nonlinearities in the transmitter due to nonlinearities in the force/deflection characteristic of the coupling spring 23 and to manufacturing tolerances in other parts of the transmitter, be substantially independent of the motor speed. In practice, these nonlinearities dictate that any variation in motor speed should be within certain bounds; the range of motor speed variation which may be permitted increases with the extent to which nonlinearities in the transmitter characteristic may be neglected.

Another factor to be taken into account in deciding the operating speed and the range of permissible motor speed variation, is the signal resolution ability of the pickoffs 62 and 67.

Figure 6:
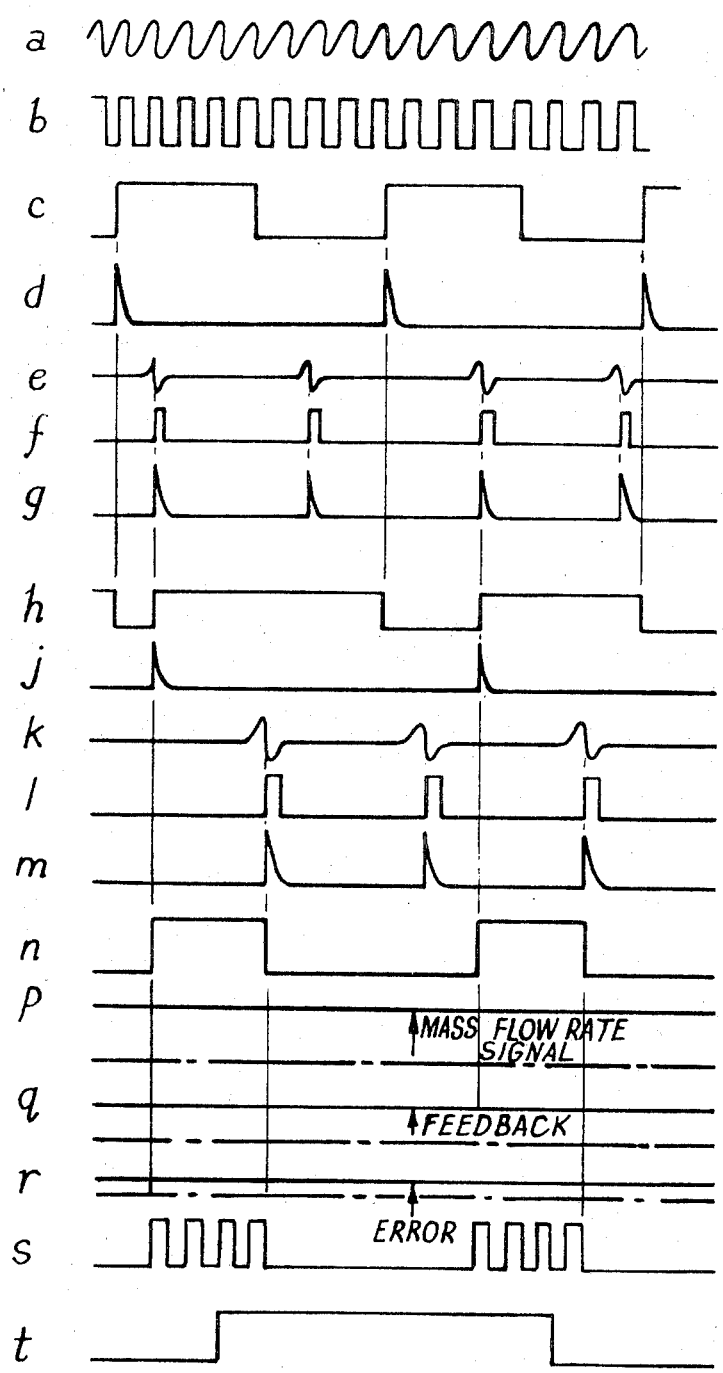
FIG. 6 is a waveform diagram for the circuitry of FIG. 5.

Pulses developed at the pickoff outputs are supplied to data processing circuitry shown in FIG. 5. FIG. 6 shows waveforms appropriate to this circuitry. In this circuitry a crystal oscillator 101 develops clock pulses shown in waveform $a$ which are squared by Schmidt trigger 102 to produce a waveform $b$ which is fed to a binary divider 103 to give the output waveform $c$. This is differentiated and steered (by which is meant that the pulse resulting from the trailing edge is eliminated) by a capacitor and diode unit 104 to give the waveform $d$. This represents a train of regularly-recurring trigger pulses, with a period chosen to be sufficiently great, having regard to all possible periods between a pair of drum and impeller pulses from the transmitter, to allow at least one of any such transmitter period to start and end in the course of a period between trigger pulses, called the "sampling period". The trigger pulses are fed to one side of a first bistable switch 105.

Drum pulses from the transmitter having a waveform $e$ pass through an amplification and squaring stage 106 to produce a waveform $f$ and are differentiated and steered by a capacitor and diode unit 107 to produce a waveform $g$. This is fed to the other side of the first bistable switch 105. The output from the first bistable switch then has the waveform $h$ which is differentiated and steered by a capacitor and diode unit 108 to result in the waveform $j$. These trigger pulses are fed to one side of a second bistable switch 109.

Impeller pulses from the transmitter having a waveform $k$ are similarly amplified and squared by stage 110 to produce the waveform $l$. Differentiation and steering of the pulses in capacitor and diode unit 111 gives a waveform $m$ and these trigger pulses are fed to the other side of the second bistable switch 109.

The output from the second bistable switch 109 has the waveform $n$. It will be seen that the square waves in this waveform have a duration proportional to mass flow rate, as their leading edges are defined by drum pulses and their trailing edges by impeller pulses. Furthermore, it will be seen that, in this embodiment, one and only one square wave is produced in each sampling period.

The resulting square waves, although irregularly spaced between consecutive pairs, are thus regular in the sense that, say, 10 square waves always appear over 10 sampling periods, which might, in one embodiment, represent a time of 3 seconds. This type of periodicity is adequate for all known applications of mass flowmeters. It will be seen that, although transmitter speed may vary this sampling system produces a mass flow rate signal of substantially regular nature.

The waveform $n$ is applied to a logic circuit L which transmits the pulses constituting the waveform $n$ only if the pulses have a mark/space ratio which is not less than a certain value. The logic circuit L is hereinafter described in greater detail.

Pulses transmitted by the logic circuit L are fed to an R.C. network 112 to produce an analogue voltage level $p$ proportional to the mass flow rate. This voltage level is compared in a comparator 113 with a voltage level $q$ driven from a feedback potentiometer 114 linked to a pointer 115 displaying mass flow rate on a suitably-graduated scale. The error signal $r$ from the comparator 113 is amplified by an amplifier 116 and used to energize a motor and gear train 117 which acts to null the error signal and to drive the pointer to a corresponding position.

The mass flow rate signal $n$ is integrated by using it to control a gate 118 to pass squared clock pulses (waveform $b$) from the crystal oscillator 101 and Schmidt trigger 102. The resultant output has a waveform $s$ in which each gated clock pulse represents a discrete and known mass of fuel. This waveform is fed to a binary divider 119 to give an output $t$ of 1 pulse per unit of mass. The divide ratio of the binary divider is chosen to give the desired output units, for example, 1 pulse equaling 1 kilogram of fuel. This pulse output is passed through an amplifier 120 to drive a fuel consumed indicator 121 registering, for example, kilogram of fuel which have passed through the transmitter to an aircraft engine. Of course, the indicator 121 could equally well be a fuel remaining indicator the pulses $t$ then being supplied subtractively, instead of additively, to the indicator.

Figure 7:
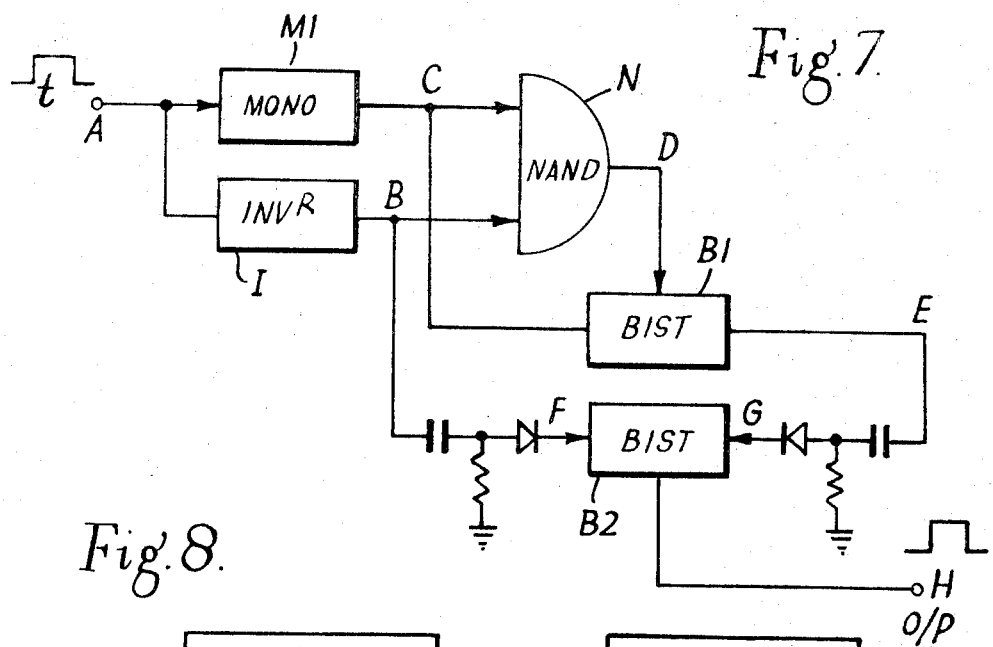
FIG. 7 is a block schematic diagram of a logic circuit forming part of the data processing circuitry of FIG. 5.

The logic circuit L (FIG. 7) comprises: a monostable circuit M1, a 'NAND' circuit N, an inverter I, and bistable circuits B1 and B2. The waveform $n$ developed at the output of the bistable 109 switch is applied to the logic circuit L at the point A. The signals at the points A to G of the logic circuit L are represented in the waveform diagrams FIGS. 8 and 9.

Figure 8:
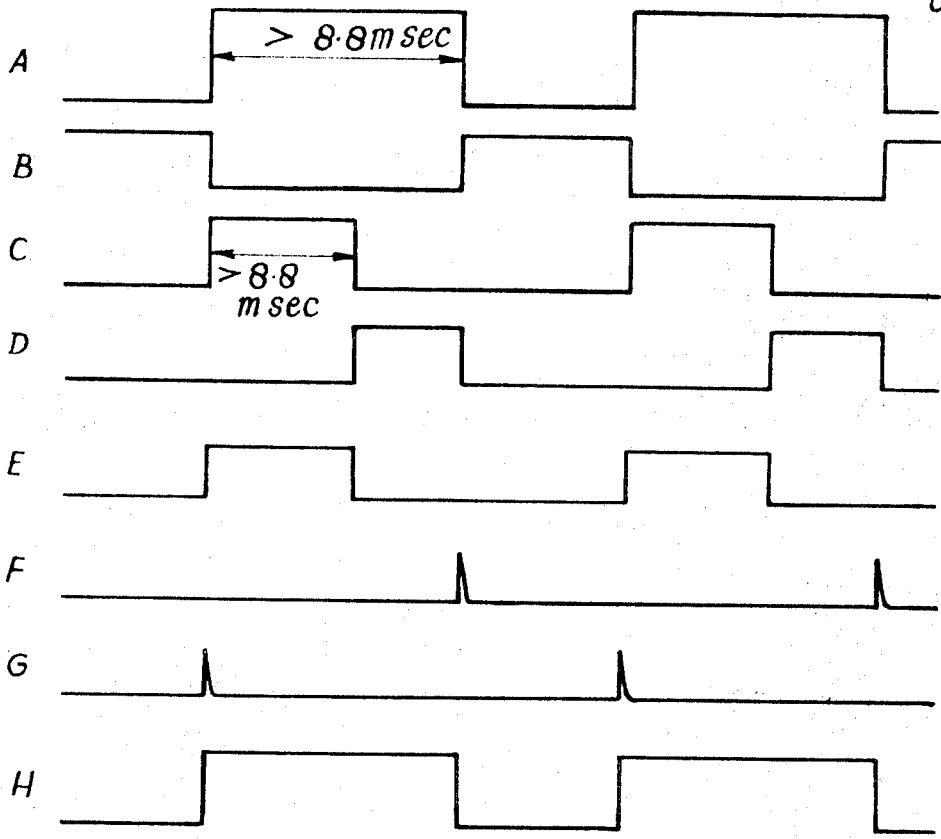
FIGS. 8 and 9 are waveform diagrams appropriate to the logic circuit of FIG. 7.
Figure 9:
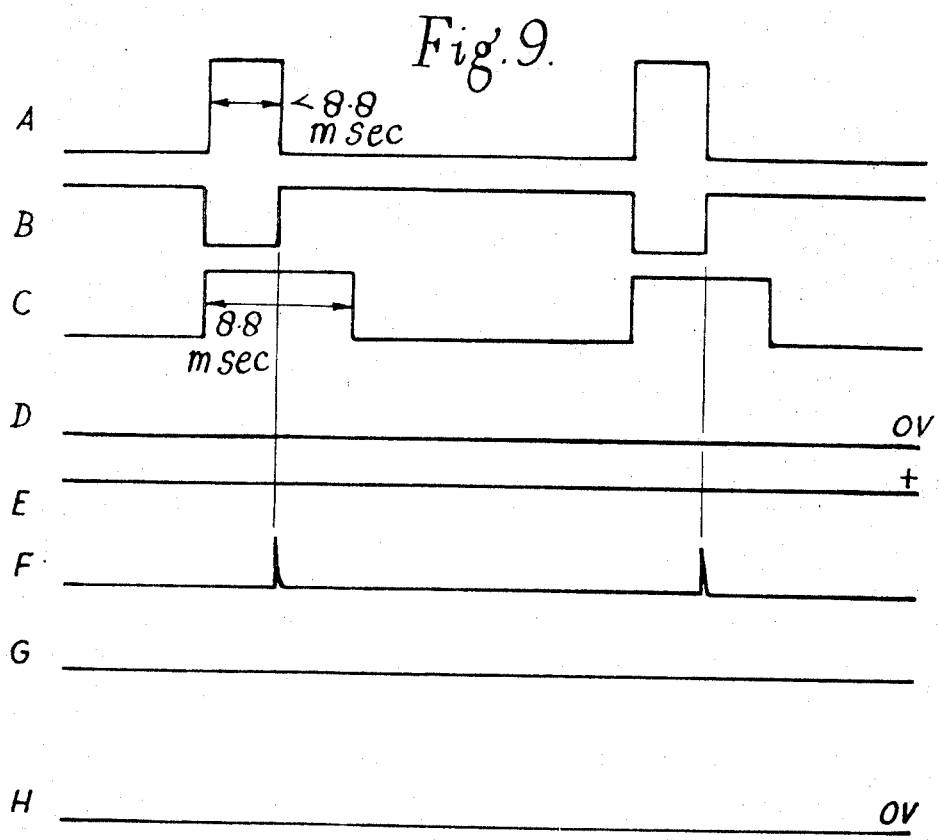

From the waveform diagram, FIG. 8, it will be seen that where the pulse appearing at point A of the logic circuit L has a pulse width in excess of the pulse developed by the monostable circuit M1, the logic of the circuit dictates that the pulse developed at the output point H has a width equal to the pulse applied at the point A. On the other hand it will be seen, from FIG. 9, that where the width of the pulse applied at point A of the logic circuit L is less than that of the pulse developed by the monostable circuit M1 no output pulse is developed at the output point H of the logic circuit.

The time constant of the monostable circuit M1 has a value greater than that of any pulse which might be developed when the motor 18 is driving the impeller 15 of the transmitter but no fluid is passing through the transmitter. In such circumstances the presence of fuel in the transmitter still gives rise to a lag between the impeller 15 and the drum 27 and therefore output signals are given by the transmitter of the same general nature as when fuel is flowing but characteristic in phase relationship of zero flow rate. Moreover, the presence of the buffer spring 73 ensures that the impeller 15 cannot lead the drum 27 when the motor 18 is driving the impeller.

In accordance with the present invention, switch means S is provided for providing a shunt path around the logic circuit L.

Figure 10:
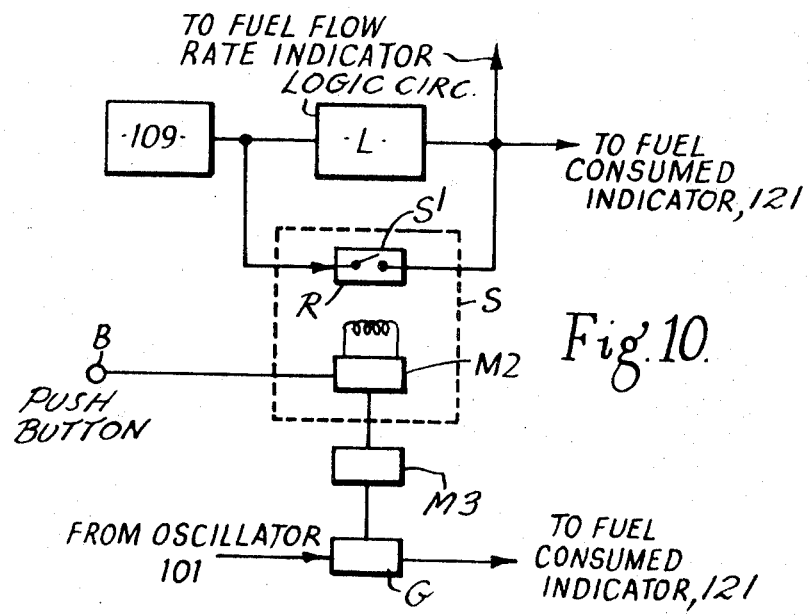
FIG. 10 is a block schematic diagram of circuitry operable to override the logic circuit of FIG. 7.

As shown (FIG. 10) the switch means S comprises a monostable circuit M2, and normally open relay contacts S' which are connected in a shunt path across the logic circuit L. When the monostable circuit M2 is triggered to the excited state, as a result of the operation of push button B, the relay R is energized and the contacts S' close. During the time that the monostable M2 is in the excited state pulses $t$ representing zero fuel flow rate may pass to the fuel consumed indicator 121. By setting the fuel consumed indicator 121 initially to zero the integrity of the flowmeter system may be checked by observing the reading given by the indicator 121 at the end of the period of excitation of the monostable M2.

To ensure that the fuel consumed indicator is reset to zero at the end of the integrity check, the monostable M2 is connected to a circuit which comprises a further monostable M3 and a gate G. The monostable M3 is triggered to the excited state by the monostable M2 when the latter monostable reverts to its stable state.

The monostable M3, when excited, opens the gate G to clock pulses from the oscillator 101. The latter pulses are supplied subtractively to the indicator 121 so as to reset the indicator to zero.

By virtue of the fact that the logic circuit L is between the bistable 109 and the R.C. network 112 the waveform $n$ is not, for zero flow rate, supplied to the circuitry specifically associated with the flow rate indicator 114. When the switch means S is operated, however, zero flow rate pulses may reach the latter circuitry. By observing the flow rate indication given by the flow rate indicator 114 in response to such pulses the integrity of the indicator 114 and the circuitry specifically associated therewith can be ascertained.

Flow rate and fuel consumed 21 may both be provided; but, as will be appreciated, the flowmetering system may have one only of these indicators. A particular requirement may call for a fuel flow rate indication only, and in these circumstances the indication given by the flow rate indicator, for example, indicator 114, would provide a check on the integrity of the whole system.

Although, in the foregoing description of logic circuit L, specific circuitry for operating the switch S' has been described it will be understood that the described circuitry is by way of example only; numerous alternative circuits could be employed to accomplish the same purpose. What it more important, the switch S' could be closed manually, the period during which the switch S' (FIG. 10) is closed being determined by reference to an accurate stopwatch.

I claim:

1. A fluid flowmeter comprising transmitter means operative to develop an output characteristic of the rate of fluid flow therethrough, including zero and nonzero flow rates, with a zero flow rate giving rise to a characteristic output of the same general nature as the outputs for nonzero flow rates; indicator means; and data processing circuitry including processing means connected with said transmitter and effectively operative to process the transmitter output to develop or generate a signal having a parameter, the value of which represents the combined zero and nonzero flow rates through the transmitter, the zero flow rate giving a parameter value below a predetermined level, a logic circuit having an input side connected with the processing means and an output side connected with the indicator means, the logic circuit including means set at said predetermined level so as normally to pass said signal including said parameter to the indicator means only when its parameter value is above the predetermined level, and switch means provided to selectively override the logic circuit by providing a shunt path from the input to the output side to allow said signal to be passed to the indicator means even when the parameter value is below the predetermined level, representative of zero flow rate.

2. A fluid flowmeter as claimed in claim 1 wherein the said signal is a pulsed signal and the said parameter is pulse length, the logic circuit comprising a timing circuit which passes only pulses above a predetermined length.

3. A fluid flowmeter as claimed in claim 2 wherein the transmitter means includes means for generating an output comprising two signal trains of equal frequency pulses, the delay between a pulse of one train and the next pulse of the other train being representative of flow rate, and the processing means comprising square wave pulse generator means connected to receive the two pulse trains and effective to generate in response thereto said signal which is a train of square pulses having a pulse duration corresponding to said delay.

4. A fluid flow meter as claimed in claim 1 wherein the data processing circuitry includes means operative in response to the transmitter output to generate, as part of said signals, discrete signals each of which represents the passage through the transmitter of a certain quantity of unit mass of fluid, said latter means including differentiating and steering means and bistable switch means connected in series with said logic circuit; and the transmitter output for zero flow rate also being selectively capable of giving rise to said discrete signals; and the indicator means comprises a resetable indicator which is responsive to said discrete signals so as to indicate the quantity of fluid which has passed through the transmitter.

5. A fluid flowmeter as defined in claim 4 wherein said override switch means comprises a timing circuit bridgingly connected with said logic circuit, and a switch therein responsive to the timing circuit to be closed for a predetermined time period thereby when the timing circuit is rendered operative.

6. A fluid flowmeter as claimed in claim 5 wherein the indicator means comprises a resettable indicator, and reset means are provided comprising a second timing circuit connected to be activated by the first mentioned timing circuit at the termination of said predetermined period; and a gate which the second timing circuit is effective to open on being activated to allow the passage of resetting signals to the indicator to reset it to the datum value.

7. A fluid flowmeter as claimed in claim 5 wherein the or each timing circuit comprises a monostable circuit arrangement.